J. M. Williams.
Hay Loader.

No. 83,749.    Patented Nov. 3, 1868.

Attest.    INVENTOR.
J. M. Williams
By Knight Bros. Attys.

ISAIAH M. WILLIAMS, OF BLANCHESTER, OHIO, ASSIGNOR TO HIMSELF AND HARVEY SMITH, OF SAME PLACE.

Letters Patent No. 83,749, dated November 3, 1868.

IMPROVEMENT IN SELF-LOADING HAY-CARTS.

The Schedule referred to in these Letters Patent and making part of the same.

*To whom it may concern:*

Be it known that I, ISAIAH M. WILLIAMS, of Blanchester, Clinton county, Ohio, have invented a new and useful Self-Loading Hay-Cart; and I hereby declare the following to be a full, clear, and exact description thereof, reference being had to the accompanying drawing, making part of this specification.

My invention relates to a device for raking hay or grain from the windrow, and conveying it to the stack or mow.

The bed or body, A, of my cart, may, for the sake of lightness, consist of an open frame-work, as represented, and is armed in front with a series of fingers, B, and supported, near its rear end, upon a bent axle, C, whose extremities, $c\ c'$, occupy two ground-wheels, D D'.

Journalled underneath my said bed are two driving-wheels, E E', having a crank-axle, F.

Figure 1:
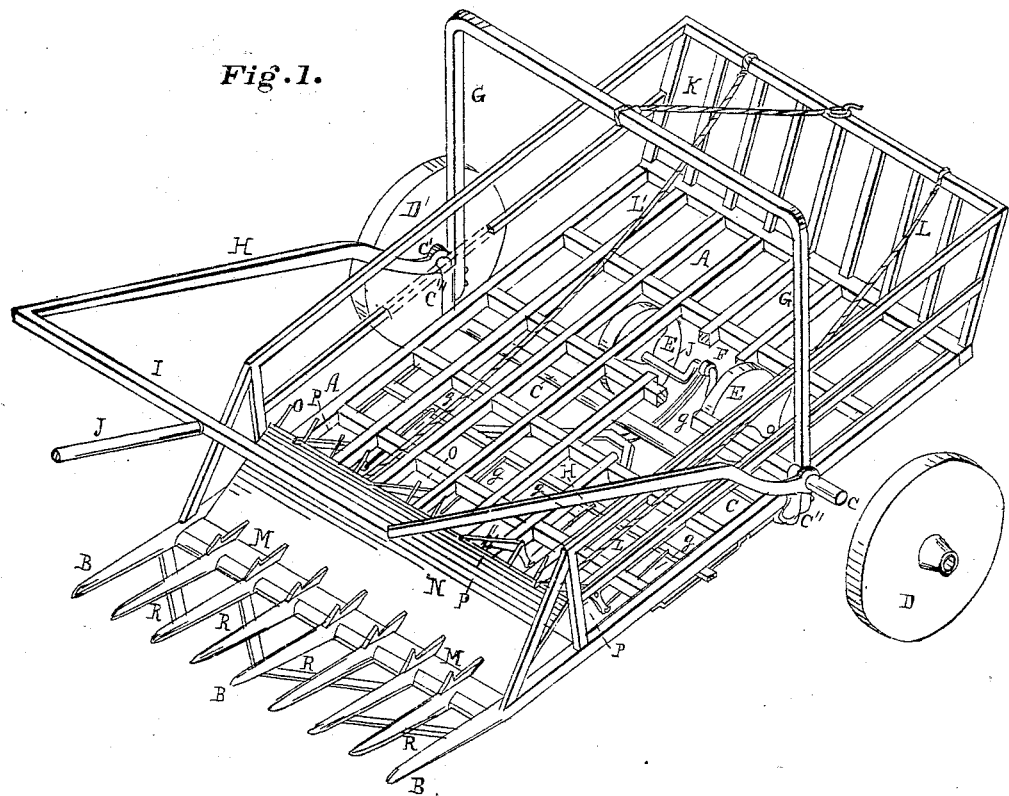
Figure 1 is a perspective view of a hay or grain-cart embodying my invention, in condition for raking and loading.

When the bends $c''\ c'''$ of the bent axle C are directed upwards, as in fig. 1, so as to depress the bed, the driving-wheels E E' are caused to rest upon the ground and support the whole weight of the cart; but when the bends $c''\ c'''$ are directed downward, so as to elevate the bed, the entire fabric rests upon the wheels D D'. This elevation and depression of the bed are effected by means of a lever, G, attached to the bent axle.

Proceeding from the parts $c\ c'$ of the bent axle is a pair of hounds or thills, H, which unite in a common cross-piece, I, for the attachment of a tongue or pole, J.

K represents a cord or chain, which, being attached to the lever G at one end, and to the back of the cart-bed at the other end, serves to retain the parts in condition for raking and loading.

L L' are two cords, which, being fastened to the upper back rail of the bed, and extended forward along its bottom, serve to facilitate the unloading of the same, in manner hereafter to be explained.

The hay or grain having been gathered up from the windrow by the fingers, is caught by a series of barbs, M, upon a shifting-board, N, whose rear edge is armed with a series of points, O. The rear edge of the board N is connected, by bell-cranks P and pitmen Q, with the crank F of the driving-wheels E E', so as to receive an alternately forward and backward motion, the backward motion being accompanied by an elevation of the rear edge of the board, so as the more effectually to push back the hay, and the said board, in its forward stroke, sliding horizontally underneath the hay, so as to disturb it as little as possible while moving forward.

Knives, R, may be attached to the under side of the fingers, to sever any stalks of hay that would otherwise clog the machine in its progress forward.

The operation is as follows:

The machine having been conveyed, upon the wheels D D', to the end of a windrow, its bed is let down by means of the lever G, so as to bring the wheels E E' and the fingers B in contact with the ground. The machine being then drawn forward, the fingers B operate to gather up the hay or grain and convey it to the shifter M N O, by which agency it is pushed to the back part of the bed.

The cart having been sufficiently loaded, the lever G is depressed, so as to bring the fingers B on to the cross-piece I, and at the same time to elevate the bed and throw the whole superincumbent weight upon the wheels D D'.

Figure 2:
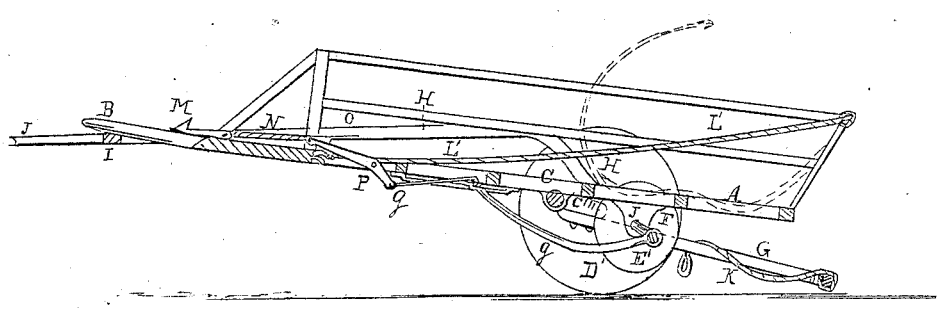
Figure 2 is a longitudinal section of the same, in condition for conveyance to the stack or mow.

The entire raking and loading-apparatus being thus removed from contact with the ground, and consequently rendered inactive, the cart may be drawn to the stack or mow, and having arrived at its destination, may be at once unloaded, by drawing backward the ends of the cords L L', as represented by dotted lines in fig. 2, or by other unloading-device.

While describing the form preferred by me, I reserve the right to vary the same. For example, an endless revolving apron, armed with points or barbs, may replace the shifting-board M N O. The obliquely-placed knives R may be replaced by knives secured longitudinally underneath the fingers B, or by endless and revolving chains.

I claim, herein as new, and of my invention—

1. A self-loading hay or grain-cart, capable of being depressed for raking and loading, and elevated for conveying, when provided with the ground-wheels D D' on bent axle C, and driving-wheels E E', for operating the board M N O, or equivalent shifting-mechanism, substantially as herein explained.

2. The shifting-board M N O, arranged and operated substantially as set forth.

3. The arrangement of depressible bed A, bent axle C, lever G, and cross-piece I, for the purposes designated.

4. The provision of one or more severing-knives R, or their equivalent, beneath the fingers B.

In testimony of which invention, I hereunto set my hand.

ISAIAH M. WILLIAMS.

Witnesses:
GEO. H. KNIGHT,
S. R. NICKERSON.